US008566494B2

(12) United States Patent
Li et al.

(10) Patent No.: US 8,566,494 B2
(45) Date of Patent: Oct. 22, 2013

(54) TRAFFIC CLASS BASED ADAPTIVE INTERRUPT MODERATION

(75) Inventors: Yadong Li, Portland, OR (US); Linden Cornett, Portland, OR (US)

(73) Assignee: Intel Corporation, Santa Clara, CA (US)

(*) Notice: Subject to any disclaimer, the term of this patent is extended or adjusted under 35 U.S.C. 154(b) by 391 days.

(21) Appl. No.: 13/076,789

(22) Filed: Mar. 31, 2011

(65) Prior Publication Data

US 2012/0254492 A1     Oct. 4, 2012

(51) Int. Cl.
*G06F 13/24*     (2006.01)

(52) U.S. Cl.
USPC .......................................... 710/263; 710/269

(58) Field of Classification Search
USPC .................................................. 710/260–269
See application file for complete search history.

(56) References Cited

U.S. PATENT DOCUMENTS

| | | | | |
|---|---|---|---|---|
| 4,385,384 | A * | 5/1983 | Rosbury et al. | 714/717 |
| 5,302,952 | A * | 4/1994 | Campbell et al. | 341/155 |
| 5,768,599 | A | 6/1998 | Yokomizo | |
| 7,137,117 | B2 * | 11/2006 | Ginsberg | 718/102 |
| 7,340,572 | B2 * | 3/2008 | Cochran | 711/162 |
| 7,360,217 | B2 * | 4/2008 | Melvin et al. | 718/102 |
| 7,975,042 | B2 * | 7/2011 | Martin et al. | 709/224 |
| 2004/0123008 | A1 | 6/2004 | Connor et al. | |
| 2004/0268366 | A1 * | 12/2004 | Kidd et al. | 719/318 |
| 2005/0086401 | A1 | 4/2005 | Connor | |
| 2010/0077394 | A1 * | 3/2010 | Wang et al. | 718/1 |

OTHER PUBLICATIONS

International Search Report & Written Opinion received in PCT Application Serial No. PCT/US2012/024374, mailed Aug. 24, 2012, 9 pages.

* cited by examiner

*Primary Examiner* — Paul R Myers

(57) ABSTRACT

An apparatus which comprises two or more moderation timers associated with an interrupt vector is presented. In one embodiment, the apparatus comprises two or more interrupt vectors and moderation timers are set with different interrupt rates. An interrupt vector logic unit sends an interrupt vector if there is an interrupt event from the queue associated with a moderation timer and the moderation timer expires.

19 Claims, 5 Drawing Sheets

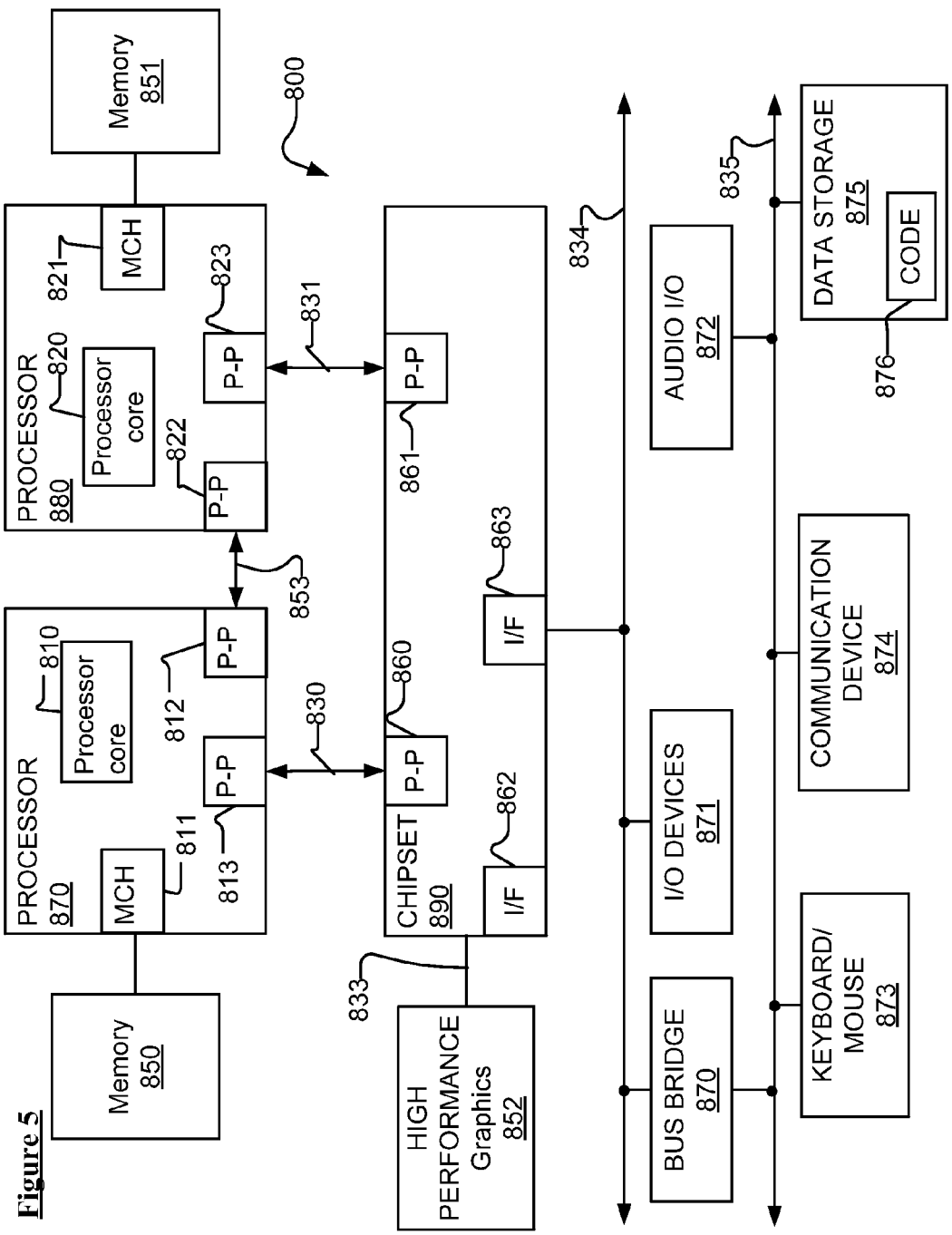

TRAFFIC CLASS BASED ADAPTIVE INTERRUPT MODERATION

FIELD OF THE INVENTION

Embodiments of the invention relate to input/output interfaces of computer systems, more particularly, embodiments of the invention relate to interrupt handling of data traffic.

BACKGROUND OF THE INVENTION

A computational device, such as a host system, may include a plurality of interrupt generating agents, such as Input/Output (I/O) controllers. Many I/O controllers are capable of receiving tens or hundreds of thousands of packets (e.g., frames, cells, etc.) per second. I/O controllers, including high-speed I/O controllers (e.g. Gigabit Ethernet MACs), may use interrupts as a method to indicate an I/O event, such as the arrival of a packet. An interrupt service routine associated with a device driver corresponding to the I/O controller may process the I/O events. The processing may include indicating the arrived packet to a protocol stack and then an application that needs the data included in the packet. Examples of high-speed interconnects include Fibre Channel over Ethernet (FCoE), Internet Wide Area RDMA Protocol (iWARP), iSCSI over data center bridge (DCB), etc. An interrupt can take up to 20,000 clock cycles in a virtualized system.

Frequent interrupts may reduce the system performance of the computational device. A high rate of interrupts can increase CPU utilization. As a result, the system may become CPU limited and unable to service the received packets. Furthermore, the amount of processing time available to other parts of the protocol stack, operating system, applications, etc., may be reduced. There may be delays in sending acknowledgments or subsequent packets may be dropped. The overall system throughput and reliability of the system may be reduced and livelock may occur. Livelock refers to a state where the processor bandwidth is completely consumed by interrupt processing and other functions are starved.

When the level of interrupts in a system impacts system performance the level of interrupts from interrupt generating agents may have to be adjusted. Some techniques include polling, which do not use interrupts, to limit interrupt levels in a system. I/O controllers may also use a single interrupt to indicate the occurrence of several interrupt events, such as ten packets being received, to reduce the number of interrupts.

Layered protocol stack architectures permit complex communication processes to be broken down into manageable components, and also permit a degree of modularity in system design. For example, in a network environment a network adapter, such as an Ethernet card or a Fibre Channel card, coupled to a host computer may receive Input/Output (I/O) requests or responses to I/O requests initiated from the host. The host computer operating system may include one or more device drivers to communicate with the network adapter hardware to manage I/O requests transmitted over a network. Data packets received at the network adapter may be stored in an available allocated packet buffer in the host memory. The host computer may also include a transport protocol driver to process the packets received by the network adapter that are stored in the packet buffer, and access I/O commands or data embedded in the packet. The transport protocol driver may include a Transmission Control Protocol (TCP) and Internet Protocol (IP) (TCP/IP) protocol stack to process TCP/IP packets received at the network adapter. Specific computing environments such as, e.g., storage networking environments may implement more complex communication protocols.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

FIG. 5 illustrates a point-to-point computer system for use with one embodiment of the invention.

DETAILED DESCRIPTION OF THE INVENTION

Figure 1:
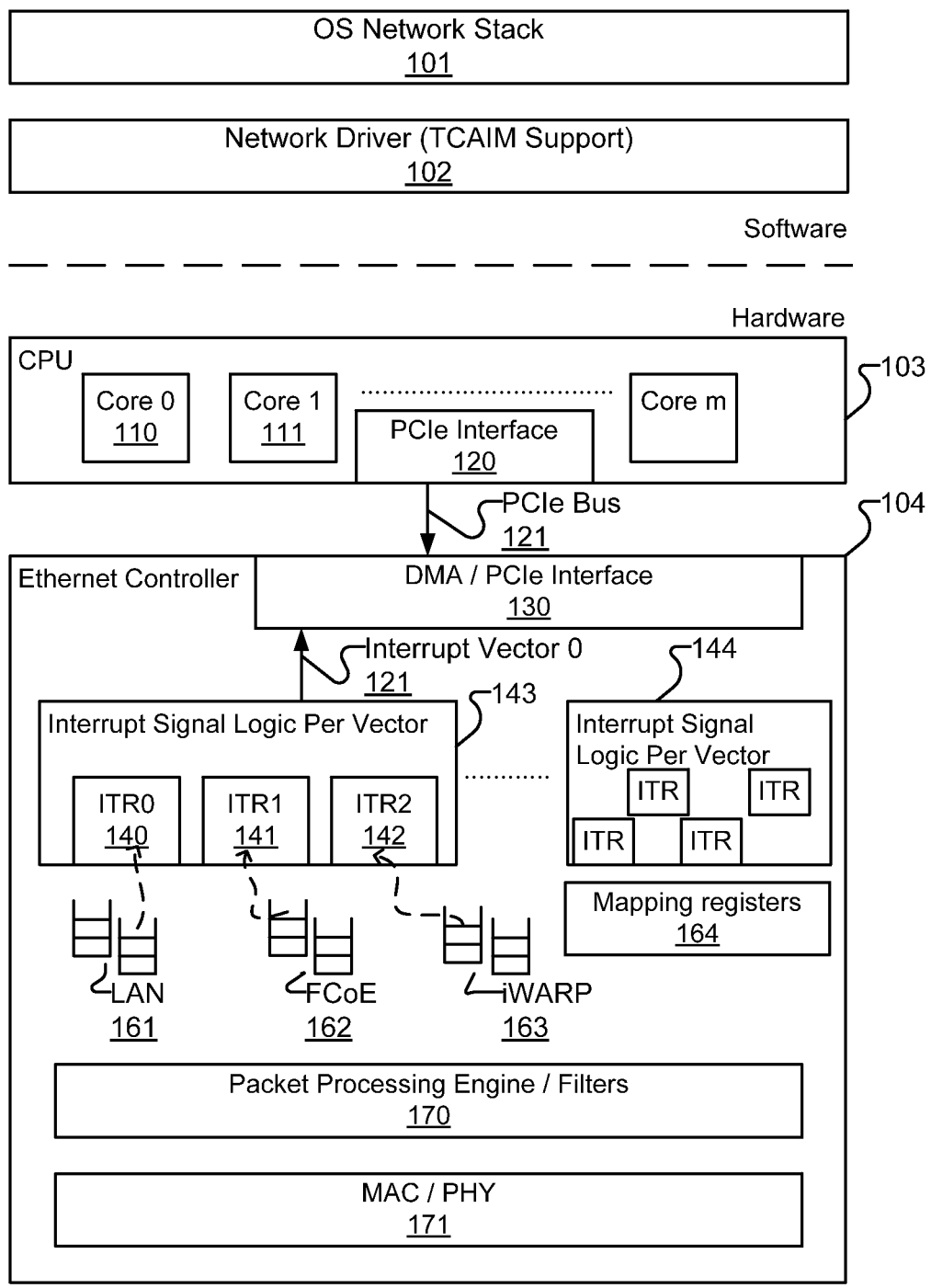
FIG. 1 is a block diagram of an interrupt handling system in accordance with one embodiment of the invention.

An apparatus which comprises two or more moderation timers associated with an interrupt vector is presented. In one embodiment, the apparatus comprises two or more interrupt vectors and moderation timers are set with different interrupt rates. An interrupt vector logic unit sends an interrupt vector if there is an interrupt event from the queue associated with a moderation timer and the moderation timer expires.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of present invention also relate to apparatuses for performing the operations herein. Some apparatuses may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, embodiments of the present invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

The method and apparatus described herein are for generic input/output interconnects. Specifically, the input/output interconnects are primarily discussed in reference to multi-core processor computer systems. However, the input/output interconnects are not so limited, as they may be implemented on or in association with any integrated circuit device or system, such as cell phones, personal digital assistants, embedded controllers, mobile platforms, desktop platforms, and server platforms, as well as in conjunction with other resources, such as hardware/software threads.

Overview

An apparatus which comprises two or more moderation timers associated with an interrupt vector is presented. In one embodiment, the apparatus comprises two or more interrupt vectors and moderation timers are set with different interrupt rates. An interrupt vector logic unit sends an interrupt vector if there is an interrupt event from the queue associated with a moderation timer and the moderation timer expires.

FIG. 1 is a block diagram of an interrupt handling system in accordance with one embodiment of the invention. Many related components such as buses and peripherals have not been shown to avoid obscuring the invention. Referring to FIG. 1, in one embodiment, the system comprises operating system network stack 101, network driver 102, and CPU 103 which includes ethernet controller 104. In one embodiment, network driver 102 supports traffic class based adaptive interrupt moderation (TCAIM).

In one embodiment, CPU 103 includes one or more processing cores (e.g., core 110, core 111) and PCI-Express (PCIe) Interface 120. In one embodiment, CPU 103 is coupled to ethernet controller 104 via PCIe Bus 121.

In one embodiment, ethernet controller 104 includes DMA/PCIe interface 130, interrupt vector logic unit 143, interrupt vector logic unit 144, packet processing engine 170, MAC/PHY layer 171, and mapping registers 164. In one embodiment, ethernet controller 104 includes one or more memory devices to support one or more LAN queues 161, one or more FCoE queues 162, and one or more iWARP queues 163. Interrupt vector logic unit 143 is coupled to send an interrupt vector (interrupt message) via the interface of "interrupt vector 0" 121.

In one embodiment, traffic class based adaptive interrupt moderation enables interrupt sharing between different traffic classes and provides an interrupt moderation rate for each traffic class. By sharing the same interrupt vector among the queues from different traffic classes (e.g., LAN, FCoE, or iWARP), the interrupt sharing reduces total system interrupts. In one embodiment, by applying different interrupt moderation rates on the queues from different traffic classes, the interrupt handling provides independent adaptive moderation algorithms to achieve a better latency for high priority traffic class. In one embodiment, the system includes hardware support ethernet controller 104 and device driver support (e.g., network drive 102).

In one embodiment, interrupt vector logic unit 143 includes three interrupt moderation timers (ITR). Interrupt vector logic unit 144 includes four or more interrupt moderation timers. Queues or other interrupt causes are assigned to each ITR to share a same interrupt moderation timer. For example, LAN queues 161 are associated with ITR 140, FCoE queues 162 are associated with ITR 141, and iWARP queues 163 are associated with ITR 142. In one embodiment, mapping registers 164 are operable to store information about the associations. In one embodiment, an ITR is capable of serving one or more queues. In one embodiment, LAN queues 161 and FCoE queues 162 share one ITR if the system decides not to differentiate between the queues.

In one embodiment, the ITRs (e.g., ITR 140, ITR 141, and ITR 143) share a same interrupt vector (i.e., interrupt message) to reduce the total interrupt vectors. In one embodiment, the number of interrupt vectors (e.g., 2 in one example) is less than the total number of moderation timers (e.g., 7 in one example) associated with different interrupt rates.

Figure 2:
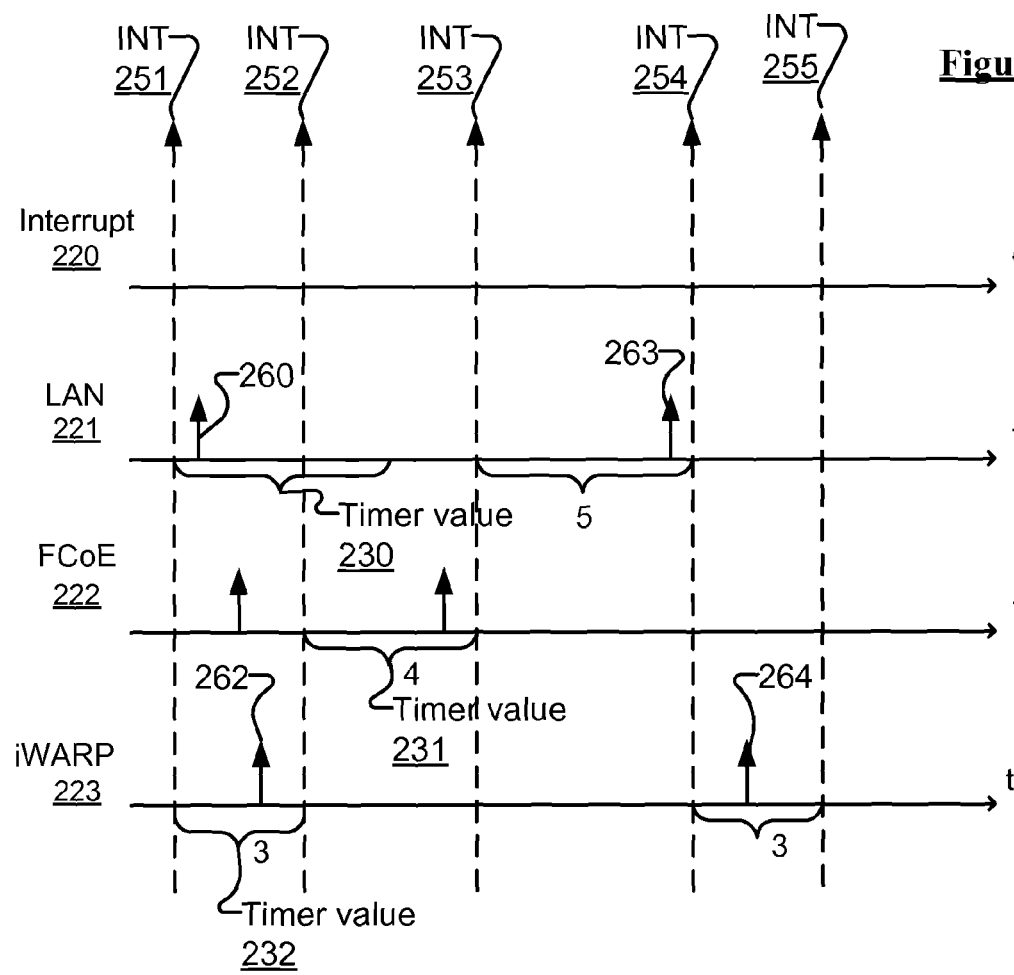
FIG. 2 shows a diagram for interrupt handling using moderation timers in accordance with one embodiment of the invention.

FIG. 2 shows a diagram for interrupt handling using moderation timers in accordance with one embodiment of the invention. The diagram shows an example of interrupt handling in conjunction with an interrupt signal logic controlling an interrupt vector (e.g., interrupt vector logic unit 143). In one embodiment, an interrupt vector logic unit controls when to send interrupt vectors (e.g., interrupts 251-255). The interrupt vector logic unit includes three moderation timers (ITRs) such as, for example, ITR 221, ITR 222, and ITR 223. Each moderation timer (ITR) is associated with one or more traffic queues. Each ITR is set with a timer value. For example, ITR 223 is set with a higher interrupt rate (timer value 232, i.e., 3) than the interrupt rate of ITR 221 (timer value 230, i.e., 5).

In one embodiment, to achieve a better latency for a high priority traffic class (e.g., iWARP queue associated with iWARP ITR 223) a smaller (the smallest) interrupt rate (e.g., 3 units of time) is assigned. In one embodiment, for example, an iWARP queue is associated with ITR 223 because of the interrupt rate of ITR 223 is set to 3 (the smallest among ITRs).

In one embodiment, if there is an interrupt event and the associated ITR expires, an interrupt vector is triggered. An interrupt vector logic unit resets the values of all ITRs to 0. In one embodiment, the reset of timers is performed such that interrupt events are not cumulative. Active events with the highest rate will determine the overall interrupt rate for a given interrupt vector.

In one embodiment, for example, interrupt 252 is triggered when iWARP ITR 223 expires and there is an event in the iWARP queue which is associated with ITR 223 (see event 262). In one embodiment, event 263 causes the triggering of interrupt vector 254 when ITR 221 expires (ITR 221 is set to 5, see timer value 230).

In one embodiment, an interrupt vector logic unit controls moderation of each interrupt vector based on three ITRs. Multiple queues with same traffic property are chained as a list and then assigned to one of three ITRs sharing the same interrupt vector. In one embodiment, each ITR setting is further adjustable during runtime by software driver.

In one embodiment, an interrupt vector logic unit triggers an interrupt vector (interrupt message) only when there is a pending event and the associated ITR timer expires. When an interrupt vector is triggered, the interrupt vector logic unit resets all three ITRs associated with the same interrupt vector. In one embodiment, by providing such a mechanism in an ethernet controller, a device driver with TCAIM provides a customized adaptive interrupt moderation (AIM) algorithm for each traffic class in a unified data center fabric. TCAIM is applicable to an individual queue or a group of queues with same property. TCAIM supports each traffic class to achieve better performance (or optimal performance) and at same time reduces total interrupts to improve overall system performance.

In one embodiment, TCAIM enables a variety of adaptive interrupt moderation algorithms even in non-DCB modes, for example, UDP transmit oriented applications which are often used in financial service industry. In such environment, a customized driver can process transmit completion of previous UDP packets in the context of sending a new UDP packet. In one embodiment, such scheme reduces interrupt vectors to almost 0 (very low). An interrupt is used to address a corner case where there is no more packet to be sent in a long time window. In one embodiment, with TCAIM, the queues for UDP transmit are chained as a list and assigned to an ITR with a very low interrupt rate. The queues for UDP receive are chained as a list and assigned to an ITR with a high interrupt rate. In one embodiment, TCP queues are assigned with different ITR settings even though they share same interrupt vector with UDP queues.

Expensive interrupt cost and large number of interrupts are scaling bottlenecks for a high speed network device in a multi-core or many-core system. In one embodiment, ITRs share interrupt vectors to reduce total system interrupts. In one embodiment, two or more ITRs (share a same interrupt vector) are set with different timer values or interrupt rates. This enables the system to different AIM algorithms per traffic class to provide good performance for each traffic class in the Unified Data Center Network environment.

Figure 3:
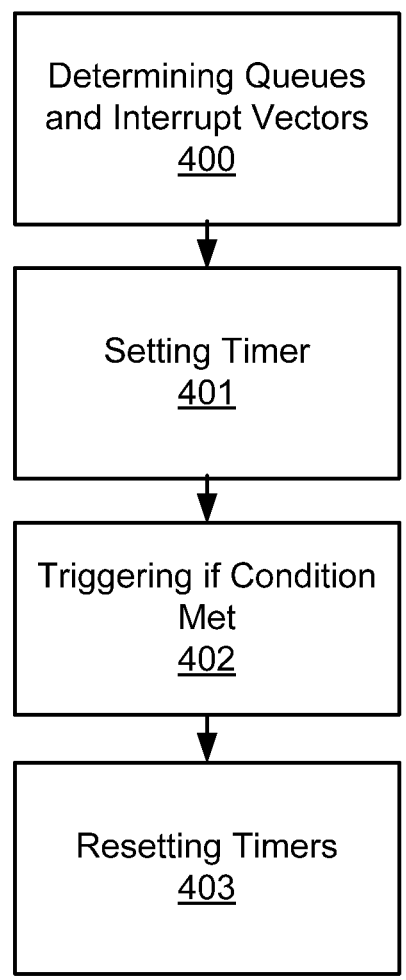
FIG. 3 is a flow diagram of one embodiment of a process for interrupt handling using moderation timers.

FIG. 3 is a flow diagram of one embodiment of a process for interrupt handling using moderation timers. The process is performed by processing logic that may comprise hardware (circuitry, dedicated logic, etc.), software (such as one that is run on a general purpose computer system or a dedicated machine), or a combination of both. In one embodiment, the process is performed in conjunction with an apparatus (e.g., ethernet controller, network device driver, or both with respect to FIG. 1). In one embodiment, the process is performed by a computer system with respect to FIG. 4.

Referring to FIG. 3, in one embodiment, processing logic begin by determining the number of queues, the number of traffic classes, and the number of interrupt vectors (process block 400). In one embodiment, processing logic decides the number of traffic classes to be enabled depending on DCB fabric configurations. Processing logic decides the number of queues to be enabled for each traffic class depending at least on bandwidth setting and system information such as the number of cores. In one embodiment, processing logic decides the total number of interrupt vectors to be enabled based on the number of traffic classes and the number of queues from each traffic class.

In one embodiment, for each queue from each traffic class, processing logic selects an interrupt vector with a proper CPU affinity. Processing logic configures and assigns the queue to one of the ITRs sharing the interrupt vector. In one embodiment, for example, high priority or latency sensitive traffic class queues are assigned to an ITR with a high interrupt rate. Bulk throughput traffic class queues are assigned to an ITR with a low interrupt rate.

In one embodiment, processing logic sets moderation timers to different values (process block 401). For example, processing logic configures an initial interrupt moderation rate on each ITR based on the traffic class property of each queue.

In one embodiment, processing logic triggers an interrupt vector if there is an interrupt event from a queue associated with a moderation timer and the moderation timer has expired (process block 402). In one embodiment, an interrupt vector is triggered and an interrupt message is sent to CPU via a PCIe bus.

In one embodiment, processing logic resets all the moderation timers associated with the same interrupt vector after the interrupt vector is triggered (process block 403). In one embodiment, the moderation timers are reset to 0. In one embodiment, processing logic invokes an interrupt processing handler. Processing logic processes the queues sharing a same interrupt vector. For the queues sharing the same ITR, processing logic performs another level of fine granularity adaptive interrupt moderation control.

In one embodiment, processing logic dynamically calculates and updates the associated ITR with a new setting based on the number of traffic packets and the number of bytes received or transmitted in each interrupt processing.

In one embodiment, a traffic class is associated with a customized AIM algorithm. For example, the low latency requirement of iWARP queues latency is prioritized in an AIM algorithm. For example, in one embodiment, LAN and FCoE queues use throughput-preferred AIM algorithms to achieve higher (highest) throughput with minimal CPU utilization.

Embodiments of the invention may be implemented in a variety of electronic devices and logic circuits. Furthermore, devices or circuits that include embodiments of the invention may be included within a variety of computer systems. Embodiments of the invention may also be included in other computer system topologies and architectures.

Figure 4:
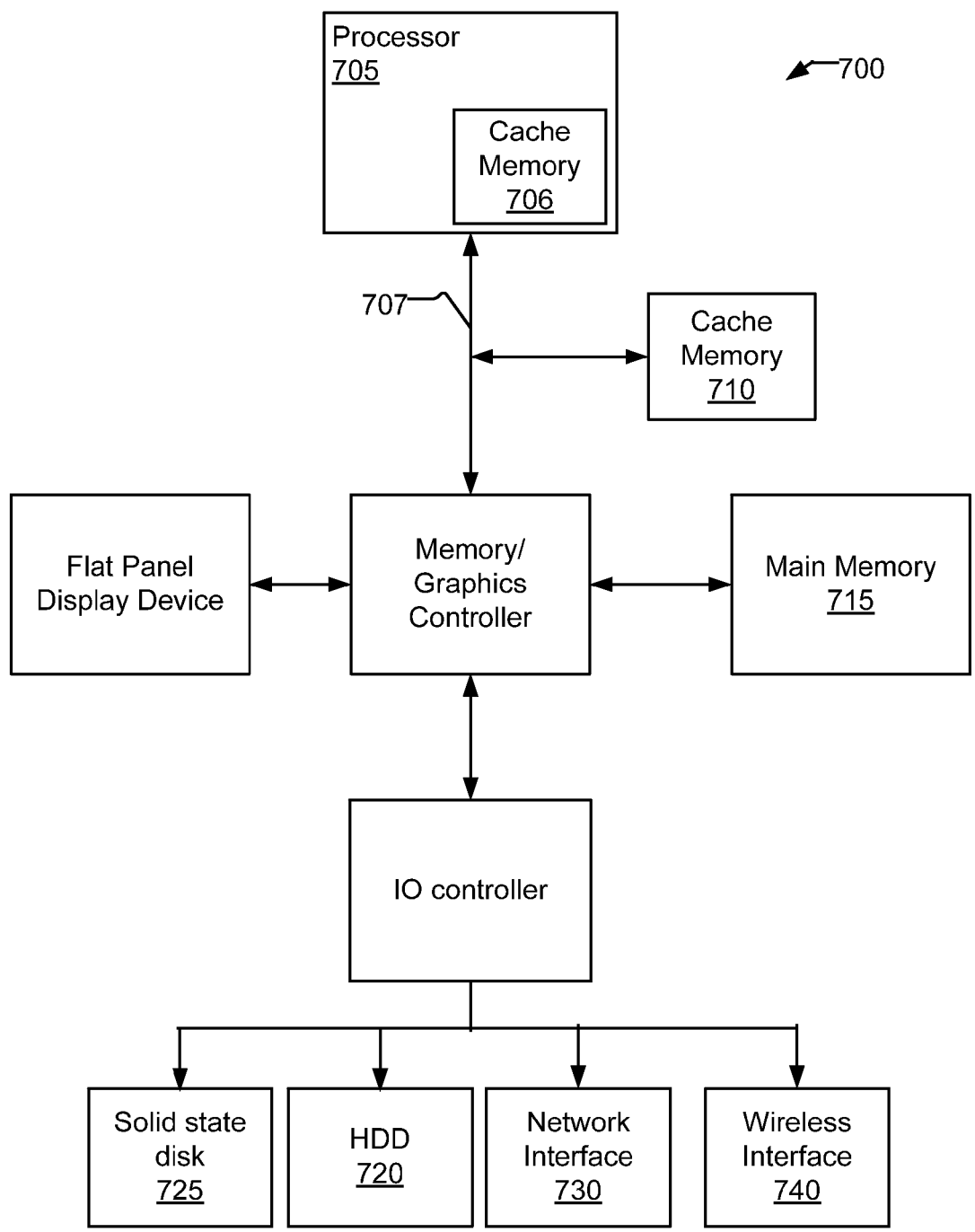
FIG. 4 illustrates a computer system for use with one embodiment of the present invention.

FIG. 4 illustrates an example of a computer system in conjunction with one embodiment of the invention. Processor 705 accesses data from level 1 (L1) cache memory 706, level 2 (L2) cache memory 710, and main memory 715. In other embodiments of the invention, cache memory 706 may be a multi-level cache memory comprise of an L1 cache together with other memory such as an L2 cache within a computer system memory hierarchy and cache memory 710 are the subsequent lower level cache memory such as an L3 cache or more multi-level cache. Furthermore, in other embodiments, the computer system may have cache memory 710 as a shared cache for more than one processor core.

In one embodiment, memory/graphic controller 716, IO controller 717, or combinations thereof is integrated in processor 705. In one embodiment, parts of memory/graphic controller 716, parts of IO controller 717, or combinations thereof is integrated in processor 705.

Processor 705 may have any number of processing cores. Other embodiments of the invention, however, may be implemented within other devices within the system or distributed throughout the system in hardware, software, or some combination thereof.

Main memory 715 may be implemented in various memory sources, such as dynamic random-access memory (DRAM), hard disk drive (HDD) 720, solid state disk 725 based on NVRAM technology, or a memory source located remotely from the computer system via network interface 730 or via wireless interface 740 containing various storage devices and technologies. The cache memory may be located either within the processor or in close proximity to the processor, such as on the processor's local bus 707. Furthermore, the cache memory may contain relatively fast memory cells, such as a six-transistor (6T) cell, or other memory cell of approximately equal or faster access speed.

Other embodiments of the invention, however, may exist in other circuits, logic units, or devices within the system of FIG. 4. Furthermore, other embodiments of the invention may be distributed throughout several circuits, logic units, or devices illustrated in FIG. 4.

FIG. 5 illustrates a point-to-point computer system for use with one embodiment of the invention.

FIG. 5, for example, illustrates a computer system that is arranged in a point-to-point (PtP) configuration. In particular, FIG. 5 shows a system where processors, memory, and input/output devices are interconnected by a number of point-to-point interfaces.

The system of FIG. 5 may also include several processors, of which only two, processors 870, 880 are shown for clarity. Processors 870, 880 may each include a local memory controller hub (MCH) 811, 821 to connect with memory 850, 851. Processors 870, 880 may exchange data via a point-to-point (PtP) interface 853 using PtP interface circuits 812, 822. Processors 870, 880 may each exchange data with a chipset 890 via individual PtP interfaces 830, 831 using point to point interface circuits 813, 823, 860, 861. Chipset 890 may also exchange data with a high-performance graphics circuit 852 via a high-performance graphics interface 862. Embodiments of the invention may be coupled to computer bus (834 or 835), or within chipset 890, or coupled to data storage 875, or coupled to memory 850 of FIG. 5.

Other embodiments of the invention, however, may exist in other circuits, logic units, or devices within the system of FIG. 5. Furthermore, in other embodiments of the invention may be distributed throughout several circuits, logic units, or devices illustrated in FIG. 5.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chipset components, programmable logic arrays (PLA), memory chips, network chips, or the like. Moreover, it should be appreciated that exemplary sizes/models/values/ranges may have been given, although embodiments of the present invention are not limited to the same. As manufacturing techniques (e.g., photolithography) mature over time, it is expected that devices of smaller size could be manufactured.

Whereas many alterations and modifications of the embodiment of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method comprising:
    setting timer values for a first plurality of moderation timers associated with a first interrupt vector, wherein each moderation timer is capable of serving one or more queues;
    triggering the first interrupt vector if there is an interrupt event from a first queue associated with a first moderation timer and the first moderation timer expires, wherein the first plurality of moderation timers include the first moderation timer and a second moderation timer; and
    resetting the first plurality of moderation timers in response to the triggering of the first interrupt vector.

2. The method of claim 1, wherein the first plurality of moderation timers share the same first interrupt vector but each moderation timer is set with a different interrupt rate.

3. The method of claim 1, wherein the first plurality of moderation timers are part of a network interface controller which is capable to send, in response to the triggering of the first interrupt vector, the first interrupt vector via an input/output interface.

4. The method of claim 1, further comprising setting second set of timer values for a second plurality of moderation timers associated with a second interrupt vector, wherein the number of interrupt vectors is less than the total number of moderation timers associated with different interrupt rates.

5. The method of claim 1, wherein the first queue is associated with the first moderation timer with a first interrupt rate higher than that of the second moderation timer if the first queue is a latency sensitive queue.

6. The method of claim 1, further comprising:
    setting a first timer value for the first moderation timer based on a predetermined value; and
    dynamically updating the first timer value based at least on data traffic of the one or more queues associated with the first moderation timer.

7. The method of claim 6, wherein the data traffic includes the number of packets and the number of bytes received or transmitted in conjunction with the one or more queues associated with the first moderation timer.

8. The method of claim 1, further comprising enabling a group of interrupt vectors including the first interrupt vector, wherein the number of interrupt vectors is based at least on the number of traffic queues.

9. The method of claim 1, further comprising determining a number of traffic classes to be enabled including a first traffic class comprising the one or more queues.

10. The method of claim 1, further comprising determining the number of queues in a traffic class based at least on bandwidth setting and the number of cores.

11. An apparatus comprising:
    a first plurality of moderation timers associated with a first interrupt vector, wherein the first plurality of moderation timers include a first moderation timer and a second moderation timer, wherein each moderation timer is capable of serving one or more queues;

a first interrupt vector logic unit to send a first interrupt vector if there is an interrupt event from a first queue associated with the first moderation timer and the first moderation timer expires; and wherein the first interrupt vector logic unit resets the first plurality of moderation timers after triggering of the first interrupt vector.

12. The apparatus of claim 11, wherein the first plurality of moderation timers and the first interrupt vector logic unit are part of a network interface controller.

13. The apparatus of claim 11, further comprising mapping registers to store at least association information between the first queue and the first moderation timer.

14. The apparatus of claim 11, further comprising a second plurality of moderation timers associated with a second interrupt vector, wherein the first and the second plurality of moderation timers are set to different interrupt rates.

15. The apparatus of claim 11, wherein a first interrupt rate of the first moderation timer is higher than a second interrupt rate of the second moderation timer if the first moderation timer is to serve the first queue that is more latency sensitive.

16. The apparatus of claim 11, wherein the first interrupt vector logic unit is operable to set a first timer value for the first moderation timer and to adjust the first timer value based at least on data traffic associated with the first moderation timer.

17. An article of manufacture comprising a computer readable storage medium including data storing instructions thereon that, when accessed by a machine, cause the machine to perform a method comprising:
setting timer values for a first plurality of moderation timers associated with a first interrupt vector, wherein each moderation timer is capable of serving one or more queues;
triggering the first interrupt vector if there is an interrupt event from a first queue associated with a first moderation timer and the first moderation timer expires, wherein the first plurality of moderation timers include the first moderation timer and a second moderation timer; and
resetting the first plurality of moderation timers in response to the triggering of the first interrupt vector.

18. The article of claim 17, wherein the first plurality of moderation timers share the same first interrupt vector but each moderation timer is set with a different interrupt rate.

19. The article of claim 17, wherein the method further comprises setting second set of timer values for a second plurality of moderation timers associated with a second interrupt vector, wherein the number of interrupt vectors is less than the total number of moderation timers associated with different interrupt rates.

* * * * *